US006792457B1

(12) United States Patent
Zhang et al.

(10) Patent No.: US 6,792,457 B1
(45) Date of Patent: *Sep. 14, 2004

(54) MULTIPLE-LEVEL INTERNET PROTOCOL ACCOUNTING

(75) Inventors: Shujin Zhang, San Mateo, CA (US); Shuxian Lou, San Jose, CA (US); Roman Peter Kochan, Irvine, CA (US); Aravind Sitaraman, Santa Clara, CA (US)

(73) Assignee: Cisco Systems, Inc., San Jose, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 09/589,609

(22) Filed: Jun. 7, 2000

Related U.S. Application Data

(63) Continuation of application No. 09/172,183, filed on Oct. 13, 1998, now Pat. No. 6,119,160.

(51) Int. Cl.[7] .............................................. G06F 15/16
(52) U.S. Cl. ....................................... 709/224; 709/227
(58) Field of Search ..................... 705/34, 42; 709/227, 709/228, 203, 221, 225, 229; 713/201, 202; 370/252

(56) References Cited

U.S. PATENT DOCUMENTS

| 5,241,594 A | 8/1993 | Kung ............................. 380/4 |
| 5,283,783 A | 2/1994 | Nguyen et al. ............. 370/16.1 |
| 5,287,103 A | 2/1994 | Kasprzyk et al. ...... 340/825.52 |
| 5,408,469 A | 4/1995 | Opher et al. ............... 370/60.1 |
| 5,519,704 A | 5/1996 | Farinacci et al. ......... 370/85.13 |
| 5,555,244 A | 9/1996 | Gupta et al. ............... 370/60.1 |
| 5,592,470 A | 1/1997 | Rudrapatna et al. ........ 370/320 |
| 5,621,721 A | 4/1997 | Vatuone ........................ 370/16 |
| 5,655,077 A | 8/1997 | Jones et al. ............. 395/187.01 |
| 5,668,857 A | 9/1997 | McHale .................... 379/93.07 |

(List continued on next page.)

FOREIGN PATENT DOCUMENTS

WO 99/53408 10/1999 ........... G06F/15/16

OTHER PUBLICATIONS

Author unknown, Radius Accounting, 1996, Livingston Enterprises, Ltd., http://docs.daphnis.com/portmaster/RADIUS/guide/7account, 7 pages.*

Christopher King, Web–Access Authentication Using Radius: An Intermediate method for secure exchanges on the Web, Web Techniques, Aug. 1996, 7 pages.*

(List continued on next page.)

*Primary Examiner*—Patrice Winder
(74) *Attorney, Agent, or Firm*—Thelen Reid & Priest, LLP; David B. Ritchie (57) ABSTRACT

A method and apparatus for providing computer network access points the capability for multiple-level accounting. A gateway device located at the access point is capable of generating Internet protocol accounting start and stop requests based on various events that need to be accounted for when a user accesses a network. These events include the user account logon, the service establishments and the Point to Point protocol (PPP) connections between the gateway device and public and private domains within the network. The counter is capable of tracking the duration of sessions and connections and the byte-count associated with the specified session or connection. The gateway device communicates with an accounting server which stores the accounting requests and matches start requests with subsequent stop requests.

54 Claims, 4 Drawing Sheets

U.S. PATENT DOCUMENTS

| | | | | |
|---|---|---|---|---|
| 5,671,354 | A | | 9/1997 | Ito et al. ............... 395/187.01 |
| 5,673,265 | A | | 9/1997 | Gupta et al. ................. 370/432 |
| 5,678,006 | A | | 10/1997 | Valizadeh et al. ..... 395/200.02 |
| 5,682,482 | A | * | 10/1997 | Burt et al. ..................... 705/42 |
| 5,684,950 | A | | 11/1997 | Dare et al. ............. 395/187.01 |
| 5,715,394 | A | | 2/1998 | Jabs ...................... 395/200.11 |
| 5,717,604 | A | | 2/1998 | Wiggins ................. 364/514 C |
| 5,729,546 | A | | 3/1998 | Gupta et al. ................. 370/434 |
| 5,740,176 | A | | 4/1998 | Gupta et al. ................. 370/440 |
| 5,745,556 | A | | 4/1998 | Ronen ........................ 379/127 |
| 5,761,507 | A | * | 6/1998 | Govett ....................... 709/203 |
| 5,768,521 | A | | 6/1998 | Dedrick ................. 395/200.54 |
| 5,778,182 | A | | 7/1998 | Cathey et al. ......... 395/200.49 |
| 5,787,253 | A | | 7/1998 | McCreery et al. ..... 395/200.61 |
| 5,799,017 | A | | 8/1998 | Gupta et al. ................. 370/419 |
| 5,812,529 | A | | 9/1998 | Czarnik et al. ............. 370/245 |
| 5,815,665 | A | | 9/1998 | Teper et al. ........... 395/200.59 |
| 5,852,812 | A | | 12/1998 | Reeder ........................ 705/39 |
| 5,898,780 | A | | 4/1999 | Liu et al. ...................... 380/25 |
| 5,905,736 | A | | 5/1999 | Ronen et al. ............... 370/546 |
| 5,913,037 | A | | 6/1999 | Spofford et al. ........ 395/200.56 |
| 5,918,016 | A | | 6/1999 | Brewer et al. ........... 395/200.5 |
| 5,922,051 | A | | 7/1999 | Sidey ......................... 709/223 |
| 5,933,625 | A | | 8/1999 | Sugiyama ................... 395/557 |
| 5,944,824 | A | | 8/1999 | He .............................. 713/201 |
| 5,960,409 | A | | 9/1999 | Wexler ......................... 705/14 |
| 5,968,116 | A | | 10/1999 | Day, II et al. .............. 709/202 |
| 5,970,477 | A | | 10/1999 | Roden .......................... 705/32 |
| 5,974,463 | A | * | 10/1999 | Warrier et al. .............. 709/225 |
| 5,987,430 | A | * | 11/1999 | Van Horne et al. ........... 705/34 |
| 5,991,810 | A | | 11/1999 | Shapiro et al. ............. 709/229 |
| 5,991,828 | A | | 11/1999 | Horie et al. .................... 710/8 |
| 6,009,103 | A | | 12/1999 | Woundy ..................... 370/401 |
| 6,011,910 | A | | 1/2000 | Chau et al. ............ 395/200.59 |
| 6,018,619 | A | | 1/2000 | Allard et al. .......... 395/200.54 |
| 6,018,770 | A | | 1/2000 | Little et al. ................. 709/223 |
| 6,021,429 | A | | 2/2000 | Danknick ................... 709/208 |
| 6,021,496 | A | | 2/2000 | Dutcher et al. ............. 713/202 |
| 6,026,440 | A | | 2/2000 | Shrader et al. ............. 709/224 |
| 6,026,441 | A | | 2/2000 | Ronen ........................ 709/227 |
| 6,035,281 | A | | 3/2000 | Crosskey et al. ............. 705/14 |
| 6,047,376 | A | | 4/2000 | Hosoe ........................ 713/201 |
| 6,052,730 | A | | 4/2000 | Felciano et al. ............ 709/225 |
| 6,091,951 | A | | 7/2000 | Sturniolo et al. ........... 455/432 |
| 6,092,196 | A | | 7/2000 | Reiche ....................... 713/200 |
| 6,104,704 | A | * | 8/2000 | Buhler et al. ............... 370/252 |
| 6,119,160 | A | | 9/2000 | Zhang et al. ............... 709/224 |
| 6,141,687 | A | | 10/2000 | Blair .......................... 709/225 |
| 6,205,479 | B1 | * | 3/2001 | Dulai et al. ................. 709/203 |
| 6,219,790 | B1 | * | 4/2001 | Lloyd et al. ................ 713/201 |
| 6,282,575 | B1 | * | 8/2001 | Lin et al. .................... 709/221 |
| 6,442,588 | B1 | * | 8/2002 | Clark et al. ................. 709/203 |
| 2002/0002688 | A1 | * | 1/2002 | Gregg et al. ................ 713/202 |

OTHER PUBLICATIONS

Carl Rigney et al., RFC 2138 Remote Authentication Dial In User Service (RADIUS), Apr. 1997, RFC editor, Internet Society.*

Carl Rigney, RFC2139 Radius Accounting, Apr. 1997, RFC editor, Internet Society.*

Carrel, D. et al., The TACAS+ Protocol, Version 1.78, Cisco Systems, Inc., printed from ftp://ftp–eng.cisco.com/edweber/tac–rfc.1.78.txt on Oct. 23, 2000.

"Active Software's Integration System", Active Software, Inc., printed from http://www.activesw.com/products/products.html, on Jul. 24, 1998.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Cisco Systems, Inc., "Cisco DNS/DHCP Manager V.1.1", printed from http://www.combinet.com/warp/public/751/dnsmg/dnsmg/dnsmg_ds.htm, on Sep. 10, 1998, 4 pages.

Cisco Systems, Inc., "Cisco DNS/DHCP Manager V.1.", printed fromhttp://www.combinet.com/warp/public/751/dnsmg/dnsmg_pa.htm, on Sep. 10, 1998, 7 pages.

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Edell, et al., "Billing Users and Pricing for TCP", 1995 IEEE, IEEE Journal on Selected Areas in Communications, pp. 1–14.

"Hot Products & Solutions", Network Registrar, American Internet Corportaion, printed from http://www.american-.com/networkregistrar, html, on Jul. 24, 1998.

"Hot Products & Solutions—IP Address Management: A White Paper", Network Registrar, American Internet Corporation, Bedford, MA, printed from http://www.american-.com/ipmgmt.html, on Jul. 24, 1998.

"Regain Confidence and Control Over Your IP Address Infrastructure", Network Registrar, American Internet Corporation, Bedford, MA.

"Three Ways to Manage IP Addresses", PC Magazine: IP Address Management, printed from http://www.zdnet.com/pcmag/features/ipmanage/ip–s2.htm, on Sep. 10, 1998.

* cited by examiner

MULTIPLE-LEVEL INTERNET PROTOCOL ACCOUNTING

This application is a continuation of Ser. No. 09/172,183 filed Oct. 13, 1998, now U.S. Pat. No. 6,119,160.

BACKGROUND OF THE INVENTION

1. Field of the Invention

The present invention relates to an accounting method and apparatus used in a computer network. More particularly, the present invention relates to a method and apparatus for generating time-based and/or byte-based accounting for various significant start/stop events using standard Internet protocol, such as the Remote Authentication Dial-In User Service (RADIUS) protocol.

2. Background

The ability to provide computer networking capabilities to the home personal computer (PC) is typically provided by telephone companies (Telcos) or commercial Internet Service Providers (ISPs) who operate network access points along the information superhighway. Network access points which are commonly referred to as Points of Presence or PoPs are located within wide area networks (WAN) and serve to house the network interfaces and service components necessary to provide routing, bridging and other essential networking functions. It is through these network access points that the user is able to connect with public domains, such as the Internet and private domains, such as the user's employer's intra-net.

Currently, Telcos and ISPs are limited in the means by which they can charge customers for their product. Basically, Telcos and ISPs are confined to either charging a flat fee, typically on a monthly basis, thus allowing the user unlimited network access for the specified period, or charging the user on a rate basis, typically an hourly rate. These billing schemes are primitive because the current capabilities possessed by the Telcos and ISPs provide only a simplified means of accounting for the events which a user undertakes during the time the user is logged on to the access point. Current technology only allows for the Telco or ISP to account for the duration of the period from when a user logs-on to the Telco or ISP and when the user subsequently logs-off.

As an example, a user implements a "dashboard" application on their host/computer which requires them to input identification and authorization information. This information is then sent via modem and telephone line to the Telco or ISP operated access point. A network access server (NAS) receives the identification and authorization information and proxies it to an authentication, authorization and accounting server. Once the server verifies the user authentication and authorization it grants the user logon access to downstream public and private networks. At this point a counter within the NAS is engaged which begins tracking the duration of the log-on session as well as the byte count encountered during the session. Subsequently, when the user desires to log off or a log off is warranted by other means outside of the control of the user, the counter within the NAS is disengaged and the appropriate accounting data is forwarded to the accounting server.

The Telco or ISP would benefit from having a more developed accounting scheme which allows for the tracking of various major events which occur during the life of the logon session. For example, through the Telco or ISP the user is capable of connecting with various services (e.g. the Internet, private intra nets, private pay-for-access domains). Additionally, once the user has initialized or connected to the service, the individual PPP connections and PPP disconnections in to and out of the service can be accounted for. Such multiple-level accounting would provide the Telco or ISP with flexibility in devising sophisticated rate schemes. The ISPs and Telcos would no longer be restricted by rate schemes solely based on account logon and account logoff, but rather customers could be charged in accordance to the specific services which they access and the duration, byte-count or quantity of the connections to those service. The ability to account for service establishment and PPP connections allows Telcos and ISPs to offer their customers (i.e. computer users) cost effective access to communities of interest (i.e. those domains sites which are designated as pay-per-use.) Telcos and ISPs would be afforded the capability to provide detailed billing information and create various service options.

BRIEF DESCRIPTION OF THE INVENTION

The present invention is a method and apparatus for providing computer network access points the capability for multiple-level accounting. A gateway device located at the access point is capable of generating Internet protocol accounting start and stop requests based on various events that are to be accounted for when a user accesses a network. These events include the user account logon, the service establishments and the Point to Point protocol (PPP) connections between the gateway device and public and private domains within the network. The counter is capable of tracking the duration of sessions and connections and the byte-count associated with the specified session or connection. The gateway device communicates with an accounting server which stores the accounting requests and matches start requests with subsequent stop requests.

OBJECTS AND ADVANTAGES OF THE INVENTION

Accordingly, it is an object and advantage of the present invention to provide a method for network access point maintainers to implement multiple-level accounting which thereby provides the capability for detailed billing records and create various service options.

Another object and advantage of the present invention is to provide for an accounting system within a PoP of a computer network which is capable of multiple-level accounting.

Another object and advantage of the present invention is to provide a computer network service provider the capability to account for account logons, service establishments and PPP connections.

Another object and advantage of the present invention is to provide a secured means for providing multiple-level accounting by implementing means for retrying accounting requests and providing for secondary hardware back-up.

Yet another object and advantage of the present invention is to allow for the accounting request packets to use eight byte integers thus operating at 1.5 meg bits/second and eliminating the concern over counter overflow.

These and many other objects and advantages of the present invention will become apparent to those of ordinary skill in the art from a consideration of the drawings and ensuing description.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

The present invention allows the computer network service provider to assemble accounting records for three separate accounting events. These events are the initial network account logon/logoff, the service establishment/termination and the individual connection starts and stops to a specified service. The present invention is capable of accounting for both the time duration for an event and for the byte count encountered during a given event.

Figure 1:
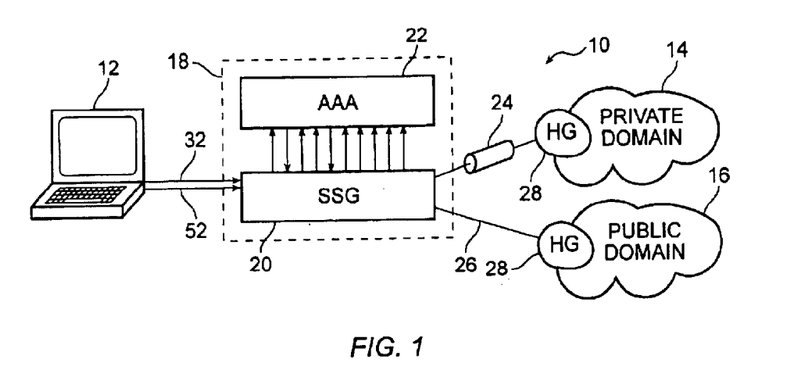
FIG. 1 is a schematic drawing of a computer network embodying a method for multiple-level Internet protocol accounting in accordance with a presently preferred embodiment of the present invention.
Figure 2A:
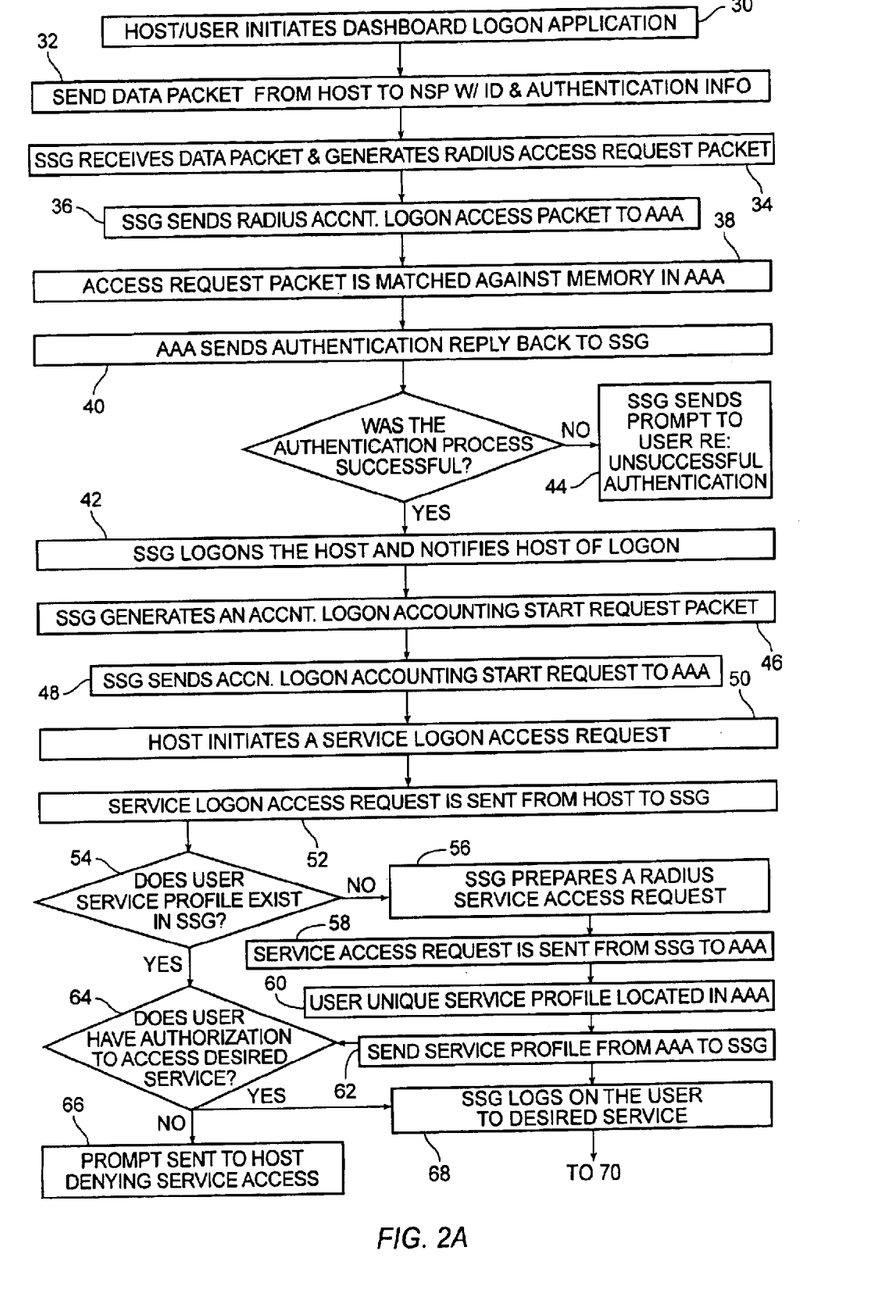
FIGS. 2A and 2B are a flow diagram of a method for multiple-level Internet protocol accounting in a computer network in accordance with a presently preferred embodiment of the present invention.
Figure 2B:
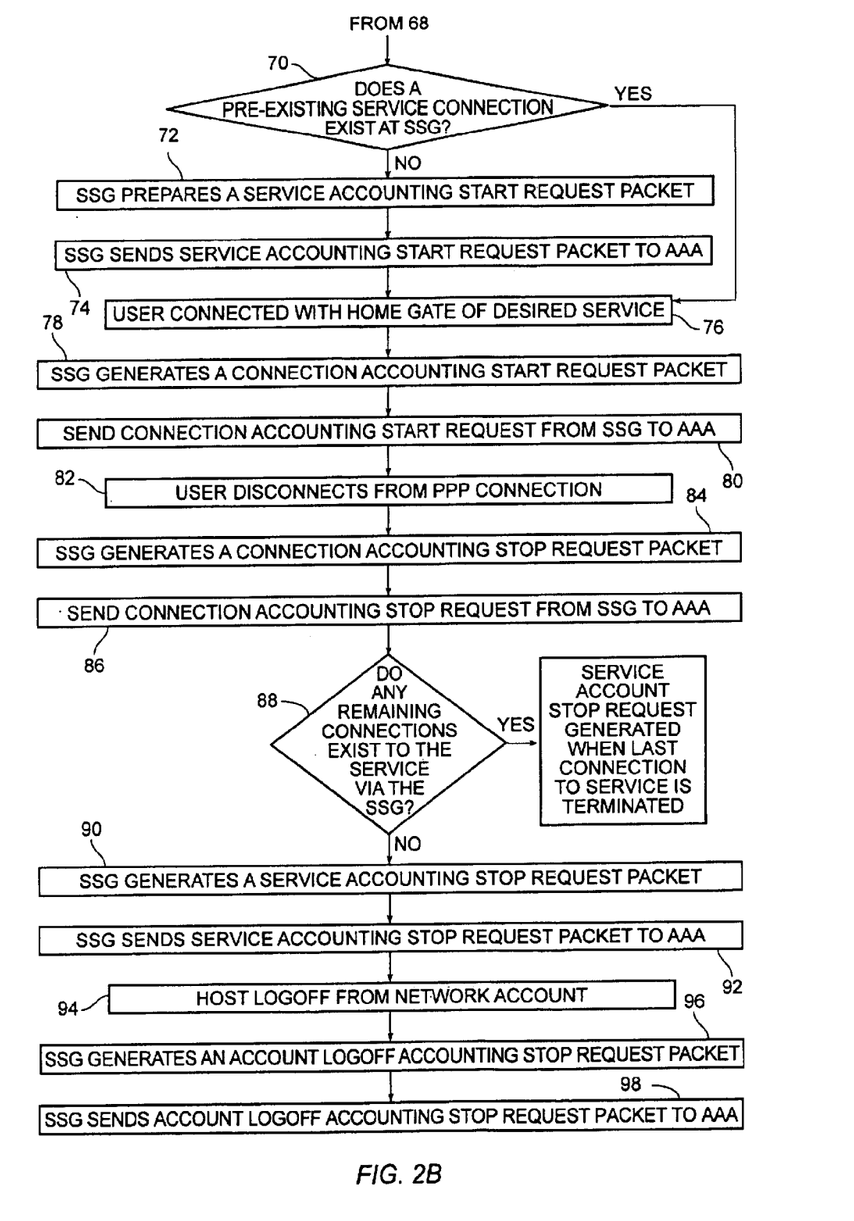

In a presently preferred embodiment of the present invention, a method for multiple-level internet protocol accounting is illustrated by the computer network schematic of FIG. 1 and the flow diagrams of FIGS. 2A and 2B. In the simplified schematic of a computer network 10 shown in FIG. 1, the host 12 is able to connect with various private and public network domains 14 and 16, including the internet through an access point 18. The access point 18 is typically a computer network service provider, such as a telephone company (Telco) or commercial internet service provider (ISP). The access point serves as a link in the overall network scheme and houses various network interfaces and service components capable of routing and transferring data to and from various points on the network. Shown in FIG. 1 are a service selection gateway (SSG) 20, such as the Cisco model 6510, manufactured by Cisco Systems, Inc. of San Jose, Calif. and an authentication, authorization and accounting (AAA) server 22, such as Cisco ACS or Cisco Secure, manufactured by Cisco Systems, Inc. of San Jose, Calif. These devices are located within the access point 18 and are instrumental in carrying out the multiple-level internet protocol accounting method of this presently preferred embodiment. The AAA server 22 may accommodate several client SSG's simultaneously and communicate with one another according to a standard Internet protocol. For the presently preferred embodiment of this invention, the Remote Authentication Dial-In User Service (RADIUS) protocol is used as the communication protocol between the SSG 20 and the AAA server 22. Those of ordinary skill in the art will realize that other internet protocols can be used as acceptable communication means between the various communication devices which encompass the computer network 10.

At step 30 of FIG. 2A, the user of the host computer 12 initiates a dashboard application program as a means of gaining access to a desired computer network. The dashboard application program will typically require the user to enter some form of user identification and authentication information, most generally, a user-name and a private password. It may be possible for the host computer to store such information in memory and provide this information to the application program automatically upon initiating the program. The application program will then contact a computer network service provider, typically a telephone company (Telco) or commercial internet service provider (ISP), via a modem and telephone line. At step 32, the host 12 sends to the computer network service provider a RADIUS logon request data packet containing the user identification and authentication information. This data packet can come directly from the host computer 12 or, it is also within the inventive concept herein disclosed, to have this packet sent from an external web server.

At step 34, the computer network service provider receives the RADIUS logon request data packet at the SSG 20 and initiates a RADIUS account logon access request packet for host authentication. At step 36, the RADIUS account logon access request packet is directed to the AAA server 22 where, at step 38, the access request packet is matched against unique user profiles in memory to verify the authenticity of the user host 12. Next, at step 40 the AAA server 22 sends an authentication reply back to the SSG 20 which confirms the authentication and lists the services available for a particular user. If the authentication reply indicates that the authentication process was successful then, at step 42, the SSG 20 logons on the host 12 by sending an access-accept packet from the SSG 20 to the host 12 informing the user that the logon process has been completed and displaying the available services on the user's dashboard. If the authentication reply indicates that the authentication process was unsuccessful then, at step 44, the SSG 20 sends a prompt back to the host 12 notifying the user that the authentication process was unsuccessful.

Once the SSG 20 logons on the host 12, at step 46 the SSG 20 generates an account logon accounting start request and, at step 48, this accounting start request is sent to the AAA server 22. In the preferred embodiment the RADIUS account logon accounting start request will have the following attributes associated with the record:

Acct-Status-Type=Start
NAS-IP-Address=ip_address
User-Name="username"
Acct-Session-Id="session_id"
Framed-IP-Address=user_ip
Proxy-State="n"

where:

ip_address=IP address of the SSG interface card 1.
username=Name used to log on to the service provider network
session_id=Session Number
user_ip=IP address of the user's system
n=Accounting record queuing information Once the account logon accounting start request has been completed, at step 50, the host 12 is capable of initiating a service logon request. At step 52, the service logon request is sent from the host 12 to the computer network service provider where it is received by the SSG 20. The SSG 20 makes an initial determination, at step 54, to determine if the requested service profile is available within the SSG 20. If the service profile pre-exists in the SSG 20 then a determination is made, at step 64, as to whether the user has authorization to access the desired service. If no service profile exists, then at step 56, the SSG 20 prepares a RADIUS service access request packet as a means for verifying the authorized services available for the given user. The RADIUS service access request packet is sent, at step 58, to the AAA server 22 where the information in the service access request packet is used to locate, at step 60, service profile stored in the memory of the AAA server 22. Once the service profile is found, it is forwarded to the SSG 20 at step 62 and at step 64 a determination is made as to whether the user has authorization to access the desired service. If no match to the desired service is found within the user profile then authorization to access the service is withheld and, at step 66, a prompt is sent to the host 12 informing the user that service authorization is denied. If the service to which the user 12 desires access to is found within the user profile then the SSG 20 at step 68, logs the user on to the desired service. The connection to the service may be accomplished by various means, including but not limited to, an L2TP (Layer Two Tunneling Protocol) tunnel connection 24 or a standard Internet (packet-forward) connection 26 via a leased line.

Once the service logon is successfully completed, at step 70, the SSG 20 determines whether a pre-existing service connection exists (typically, generated by any other host which connects through this particular access point). If a service connection is pre-existing then no need exists to generate a service accounting start request packet because the AAA server 22 will already have such stored in memory. If no pre-existing service connection exists, then at step 72, the SSG 20 generates a service accounting start request packet and at step 74 this request is sent from the SSG 20 to the AAA server 22. In the preferred embodiment the RADIUS service accounting start request packet will have the following attributes associated with the record:

Acct-Status-Type=Start
NAS-IP-Address=ip_address
User-Name="service"
Acct-Session-Id="session_id"
Proxy-State="n"

where:

service=Name of the service profile.
ip_address=IP address of the SSG interface card 1.
session_id=Session Number.
n=Accounting record queuing information.

Once the service establishment is completed, the user, at step 76, is connected with the home gateway 28 of the desired service. When this type of Point to Point Protocol (PPP) connection is made with the home gateway 78 of the desired service, it triggers the SSG 20, at step 80, to generate a connection accounting request packet and forward this request to the AAA server 22, step 80. In the preferred embodiment the RADIUS connection accounting start request packet will have the following attributes associated with the record:

Acct-Status-Type=Start
NAS-IP-Address=ip_address
User-Name="username"
Acct-Authentic=RADIUS
Acct-Session-Id="session_id"
Service-Info="service"
Service-Info="hg_username"
Service-Info="type"
Proxy-State="n"

where:

ip_address=IP address of the SSG interface card 1.
username=Name used to log on to the service provider network
session_id=Session Number
service=Name of the service profile.
hg_username=The username used to authenticate the user with the home gateway.
type=
    TT—Tunneled connection.
    TI—Internet (packet-forward) connection.
n=Accounting record queuing information.

Once a user desires to disconnect from an open PPP connection and, at step 82, the disconnect is executed, the SSG 20 generates a connection accounting stop request packet, step 84. While these packets will typically be generated due to a host-request disconnect command, it is also possible to generate the packets when a disconnect is prompted by other events outside the control of the user, such as, a lost-carrier, a lost-service or a session-timeout. Once the connection account stop request packet is generated, at step 86, the packet is forwarded to the AAA server 22 where it is coupled with the initial connection start request for accounting and filing purposes. In the preferred embodiment the RADIUS connection accounting stop request packet will have the following attributes associated with the record:

Acct-Status-Type=Stop
NAS-IP-Address=ip_address
User-Name="username"
Acct-Input-Octets=in-bytes
Acct-Output-Octets=out_bytes
Acct-Session-Time=time
Acct-Terminate-Cause=cause
Acct-Session-Id="session_id"
Service-Info="service"
Service-Info="hg_username"
Service-Info="type"
Proxy-State="n"

where:

ip_address=IP address of the SSG interface card 1.
username=Name used to log on to the service provider network.
in_bytes=Number of inbound bytes.
out_bytes=Number of outbound bytes.
time=Length of session in seconds.
cause=Cause of account termination. These include:
    —Lost-Carrier—Lost-Service—User-Request—Session-Timeout
session_id=Session Number.
service=Name of the service profile.
hg_username=The username used to authenticate the user with the home gateway.
type=
    TT—Tunneled connection.
    TI—Internet (packet-forward) connection.
n=Accounting record queuing information.

Once the host terminates the PPP connection, at step 88, the SSG 20 determines whether any remaining connections exist to the service. If the host 12 or other hosts connected through this access point have current connections existing with this service, then no need exists at this time to generate a service accounting stop request packet. The service accounting stop request packet will be generated only when no existing connections exist through the service connection. If the SSG 20 determines that no other then-existing connections exist through the service connection then, at step 90, the SSG 20 generates a service accounting stop request packet. While these service stop request packets will typically be generated as a result of a host-request disconnect command, it is also possible to generate the packets when a disconnect is prompted by other events outside the control of the user, such as, a lost-carrier, a lost-service or a session-timeout. Once the service account stop request packet is generated, at step 92, the packet is forwarded to the AAA server 22 where it is coupled with the initial service start request for accounting and filing purposes. In the preferred embodiment the RADIUS service accounting stop request packet will have the following attributes associated with the record:

Acct-Status-Type=Stop
NAS-IP-Address=ip_address
User-Name="service"
Acct-Input-Octets=in-bytes
Acct-Output-Octets=out_bytes
Acct-Session-Time=time
Acct-Terminate-Cause=cause
Acct-Session-Id="session_id"
Proxy-State="n"

where:

service=Name of the service profile.
ip_address=IP address of the SSG interface card 1.
in_bytes=Number of inbound bytes.
out_bytes=Number of outbound bytes.
time=Length of session in seconds.
cause=Cause of account termination. These include:
    —Lost-Carrier—Lost-Service—Host-Request—Session-Timeout
session_id=Session Number.
n=Accounting record queuing information.

Finally, once the host desires to logoff from the network account and, at step 94, the logoff is executed, the SSG 20 generates an account logoff accounting stop request packet, step 96. While these packets will typically be generated due to a user-requested logoff command, it is also possible to generate the stop packets when a logoff is prompted by other events outside the control of the user, such as a session timeout. Once the account logoff accounting stop request packet is generated, at step 98, the packet is forwarded to the AAA server 22 where it is coupled with the initial account logon accounting start request for further accounting and filing purposes. In the preferred embodiment the RADIUS account logoff accounting stop request packet will have the following attributes associated with the record:

Acct-Status-Type=Stop
NAS-IP-Address=ip_address
User-Name="username"
Acct-Session-Time=time
Acct-Terminate-Cause=cause
Acct-Session-Id="session_id"
Framed-IP-Address=user_ip
Proxy-State="n"

where:

ip_address=IP address of the SSG interface card 1.
username=Name used to log on to the service provider network.
time=Length of session in seconds.
cause=Cause of account termination. These include:
    —User-Request—Session-Timeout
session_id=Session Number.
user_ip=IP address of the user's system.
n=Accounting record queuing information.

In another preferred embodiment of the present invention the method for multiple-level accounting can include an additional accounting session implemented to provide periodic update information to the AAA server 22. These periodic accounting update request packets contain information which, typically, mirrors the data found in account logoff accounting stop request packets and serve as an added measure of security should system errors, transmission errors, or the like, prevent the actual account logoff accounting stop request from being either properly generated at the SSG 20 or properly sent to the AAA server 22. The Telco or commercial ISP is capable of defining the attributes associated with the periodic accounting update request and defining the time period between such requests.

Additional security measures can also be imposed by the SSG 20 to insure that accounting request packets are properly received by the AAA server 22. These security measures include defining within the SSG 20 scheme a retry value and an interval between retry to be employed when the SSG 20 makes a determination that an accounting request packet was not properly delivered to the AAA 22 server. The retry value and the interval between retry are SSG-user configurable.

Figure 3:
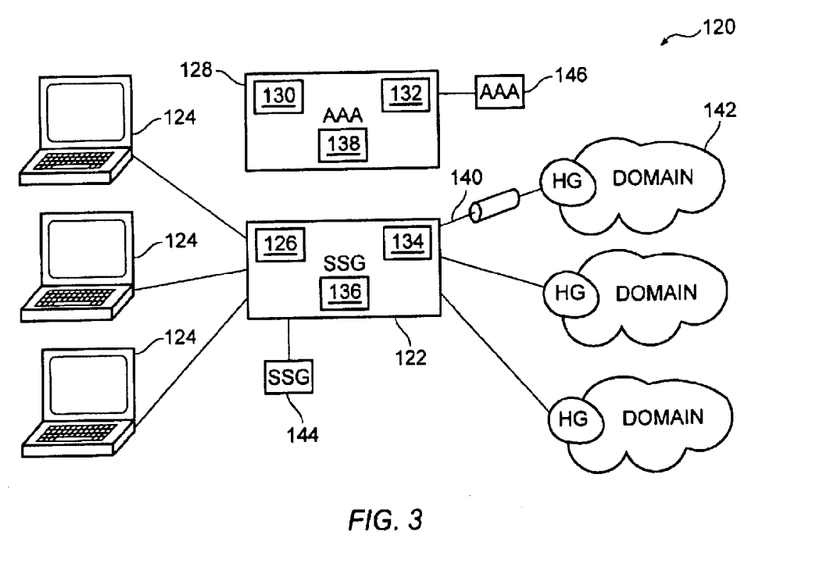
FIG. 3 is a schematic of an accounting system within a computer network which employs multiple-level Internet protocol accounting in accordance with a presently preferred embodiment of the present invention.

In another embodiment of the present invention, a networking event metering system using the multiple level accounting of the present invention is detailed in FIG. 3. In this configuration the networking event metering system 120 includes a gateway device 122. The gateway device 122 is in communication with a plurality of hosts 124, typically by means of a telephone line. Those of ordinary skill in the art will recognize that other types of host-to-gateway device access methods may be provided by a Telcos or ISP such as frame relay, leased lines, ATM (Asynchronous Transfer Mode), ADSL (Asymmetric Digital Subscriber Line) and the like. The gateway device 122 has the capability to process access requests being sent from the hosts. These access requests would include, but not be limited to, account logon requests, service authorization requests and connection requests. In a preferred embodiment, the gateway device implements the RADIUS protocol as the communication language between itself and other ISP network interfaces. The gateway device 122 receives the account logon access requests from the hosts 124 and the proxier 126 within the gateway device 122 correspondingly proxies these access requests to AAA server 128 for user authentication purposes.

The AAA server 128 then compares attribute data found in the account logon access request packets against data found in the user profiles 130 of the AAA server's memory bank. If the data in the RADIUS access requests are found to match data in the AAA server 128 then access to the network can be granted. Additionally, the AAA server 128 holds service profiles 132 within the memory bank. The user profiles 130 contain, among various data attributes, a listing of which services (private and public domains) a specified user is authorized to access. The service profiles 132, which are not user dependant, contain attribute date for a specific service domain. The gateway device 122 can query the AAA server 128 for a given user profile 130 and then within the processor 134 of the gateway device 122 assess the profile to determine which services the user has authorization to access.

The gateway device 122 also encompasses an accounting request generator 136 which is capable of generating the accounting start and stop requests for various events which are triggered within the gateway device 122. Upon the gateway device 122 authenticating the user for account logon, the accounting request generator 136 will issue an account logon accounting start request packet and forward the packet to the accounter 138 located within the AAA server 128. Similarly, upon the gateway device 122 authorizing the user to access a specific service, the accounting request generator 136 will, typically, issue a service accounting start request and forward the packet to the accounter 138 located within the AAA server 128. In the instance where the service already has a then-existing connection established by the host or any other host connecting through the gateway device 122, no need would exist to generate the service start request because such a request will already be existing within the accounter 138. Once the user establishes a PPP connection 140 to the desired service 142, the accounting request generator 136 will issue a PPP connection accounting start request and forward the packet to the accounter 138 located within the AAA server 128.

The gateway device 122 will also rely on the accounting request generator 136 to issue the accounting stop requests upon certain triggering events occurring. When the user disconnects from a PPP connection, the accounting request generator 136 will issue a PPP connection accounting stop request packet and forward this packet to the accounter 138 where it will be married with its corresponding start request for accounting purposes. While these packets will typically be generated due to a host-request disconnect command, it is also possible to generate the packets when a disconnect is prompted by other events outside the control of the user, such as, a lost-carrier, a lost-service or a session-timeout. When the user disconnects from a PPP connection the processor 134 within the gateway device 122 will determine if any additional connections remain to that particular service through that particular tunnel or routed connection. If no additional connections remain, then the accounting request generator 136 will issue a service accounting stop request packet and forward this packet to the accounter 138 where it will be married with the corresponding stop request for subsequent accounting purposes. While these service stop request packets will typically be generated as a result of a host-request disconnect command, it is also possible to generate the packets when a disconnect is prompted by other events outside the control of the user, such as, a lost-carrier, a lost-service or a session-timeout. Finally, when the host initiates an account logoff, the accounting request generator 136 will issue an account logoff accounting stop request packet and forward this to the accounter 138 where it will be married with the corresponding stop request for subsequent accounting purposes. While these packets will typically be generated due to a user-requested logoff command, it is also possible to generate the stop packets when a logoff is prompted by other events outside the control of the user, such as a session timeout.

Additionally, it is within the inventive concept herein disclosed to provide back-up capacity to both the gateway device 122 and AAA server 128 to compensate for device failures or errors in transmission. A back-up gateway device 144 allows for a safeguard should the primary gateway device 122 become temporarily inactive and fail to provide a means for generating and sending accounting start or stop requests. a secondary AAA server 146 allows for the initial accounting start request data to be catalogued in a second location should the primary AAA server encounter a temporary failure or service outage.

Figure 4:
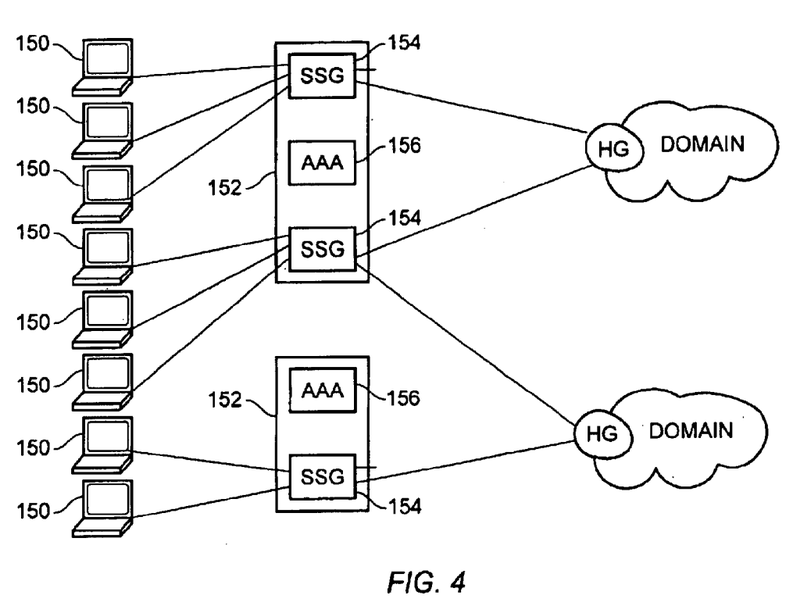
FIG. 4 is a schematic of a computer network system which employs multiple-level Internet protocol accounting in accordance with a presently preferred embodiment of the present invention.

In another preferred embodiment of the present invention, a computer network having the capabilities to use multiple-level accounting is illustrated in FIG. 4. A plurality of hosts 150 have the capacity to gain network access through network access points 152. The access point is typically operated by a Telco or ISP and houses various network interfaces and service components. Included among these components are a plurality of gateway devices 154 and AAA servers 156. The AAA servers 156 may accommodate several client SSG's simultaneously and communicate with one another according to a standard Internet protocol, such as RADIUS. The gateway devices 154 are in communication with a plurality of hosts 150, typically by means of a telephone line. Those of ordinary skill in the art will recognize that other types of host-to-gateway device access methods may be provided by a Telcos or ISP such as frame relay, leased lines, ATM (Asynchronous Transfer Mode), ADSL (Asymmetric Digital Subscriber Line) and the like. The gateway devices 154 are capable of receiving account logon and service requests from the hosts 150, proxying these requests to the, AAA servers 156 for authentication and authorization and then determining account logon and service. Once these determinations are made the gateway devices generates accounting start requests based on account logon, service establishment and PPP connection start. When the host initiates a termination request or when other events outside the control of the user dictate such, the gateway device generates accounting stop requests based on account logoff, service disconnect and PPP connection stop.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. A method for providing accounting within a computer network, said method comprising:

generating an internet protocol service accounting start request associated with a service in response to a determination that a subscriber has logged on to the service and that no other subscribers have a current connection established to the service; and generating an internet protocol service accounting stop request associated with a service in response to a determination that the subscriber has terminated the service and that no other subscribers have a current connection established to the service.

2. The method in accordance with claim 1, further comprising:

generating an internet protocol account logon accounting start request in response to a determination that a subscriber logged on to the computer network; and forwarding the internet protocol account logon accounting start request to a memory.

3. The method in accordance with claim 1, further comprising:
generating an internet protocol connection accounting start request in response to a determination that the subscriber established a connection with the requested service.

4. The method in accordance with claim 1, further comprising:
generating an internet protocol connection accounting stop request in response to a determination that the subscriber terminated the connection with the requested service.

5. The method in accordance with claim 1, further comprising:
generating an internet protocol account logoff accounting stop request in response to a determination that the subscriber logged off the computer network.

6. The method in accordance with claim 1, further comprising:
generating an internet protocol update accounting request at predetermined intervals after the internet protocol account logon accounting start request is received into the memory.

7. The method in accordance with claim 6, further comprising:
forwarding the internet protocol update accounting request to a memory.

8. A program storage device readable by a machine, tangibly embodying a program of instructions readable by the machine to perform a method for providing accounting within a computer network, said method comprising:
generating an internet protocol service accounting start request associated with a service in response to a determination that a subscriber has logged on to the service and that no other subscribers have a current connection established to the service through the computer network; and
generating an internet protocol service accounting stop request associated with a service in response to a determination that the subscriber terminated the service and that no other subscribers have a current connection established to the service through the computer network.

9. The program storage device in accordance with claim 8, wherein said method further comprises:
generating an internet protocol account logon accounting start request in response to a determination that a subscriber logged on to the computer network; and
forwarding the internet protocol account logon accounting start request to a memory.

10. The program storage device in accordance with claim 8, wherein said method further comprises:
generating an internet protocol connection accounting start request in response to a determination that the subscriber established a connection with the requested service.

11. The program storage device in accordance with claim 8, wherein said method further comprises:
generating an internet protocol connection accounting stop request in response to a determination that the subscriber terminated the connection with the requested service.

12. The program storage device in accordance with claim 8, wherein said method further comprises:
generating an internet protocol account logoff accounting stop request in response to a determination that the subscriber logged off the computer network.

13. The program storage device in accordance with claim 8, wherein said method further comprises:
generating an internet protocol update accounting request at predetermined intervals after the internet protocol account logon accounting start request is received into the memory.

14. The program storage device in accordance with claim 13, wherein said method further comprises:
forwarding the internet protocol update accounting request to a memory.

15. A system for providing accounting within a computer network, said system comprising:
means for generating an internet protocol service accounting start request associated with a service in response to a determination that the subscriber has logged on to the service and that no other subscribers have a current connection established to the service through the computer network; and
means for generating an internet protocol service accounting stop request associated with a service in response to a determination that the subscriber terminated the service and that no other subscribers have a current connection established to the service through the computer network.

16. The system in accordance with claim 15, further comprising:
means for generating an internet protocol account logon accounting start request in response to a determination that a subscriber logged on to the computer network; and
means for forwarding the internet protocol account logon accounting start request to a memory.

17. The system in accordance with claim 15, further comprising:
means for generating an internet protocol update accounting request at predetermined intervals after the internet protocol account logon accounting start request is received into the memory; and
means for forwarding the internet protocol update accounting request to a memory.

18. A system for providing accounting within a computer network, said system comprising:
an internet protocol account logon generator adapted to generate an internet protocol account logon accounting start request in response to a determination that a subscriber logged on to the computer network;
an internet protocol service accounting start request generator adapted to generate an internet protocol service accounting start request associated with a service in response to a determination that the subscriber logged on to the service and that no other subscribers have a current connection established to the service through the computer network; and
an internet protocol service accounting stop request generator adapted to generate an internet protocol service accounting stop request associated with a service in response to a determination that the subscriber terminated the service and that no other subscribers have a current connection established to the service through the computer network.

19. The system in accordance with claim 18, further comprising:
a request forwarder adapted to forward the internet protocol account logon accounting start request to a memory.

20. The system in accordance with claim 18, further comprising:
an internet protocol connection accounting start request generator adapted to generate an internet protocol connection accounting start request in response to a determination that the subscriber established a connection with the service.

21. The system in accordance with claim 18, further comprising:
an internet protocol connection accounting stop request generator adapted to generate an internet protocol connection accounting stop request in response to a determination that the subscriber terminated the connection with the service.

22. The system in accordance with claim 18, further comprising:
an internet protocol update accounting request generator adapted to generate an internet protocol update accounting request at predetermined intervals after the internet protocol account logon accounting start request is received into the memory; and
a request forwarder for forwarding the internet protocol update accounting request to a memory.

23. A program storage device readable by a machine, tangibly embodying a program of instructions readable by the machine to perform a method for providing multiple-level accounting to a computer network service provider, the method comprising:
generating an internet protocol account logon accounting start request in response to a determination that a subscriber logged onto the computer network service provider;
forwarding the internet protocol account logon accounting start request to a memory;
generating an internet protocol service accounting start request associated with a service in response to a determination that the subscriber logged on to the service and that no other subscribers have a current connection established to the service through the computer network service provider;
forwarding the internet protocol service accounting start request to a memory;
generating an internet protocol service accounting stop request associated with a service in response to a determination that the subscriber terminated the service and that no other subscribers have a current connection established to the service through the computer network service provider; and
forwarding the internet protocol service accounting stop request to a memory.

24. A method for providing accounting to a computer network, said method comprising:
receiving a user service access request at the computer network;
sending a service accounting start request associated with a requested service to an accounting server if the computer network has not established a service connection with the requested service; and
sending a service accounting stop request associated with the requested service to the accounting server if no other hosts have current connections to the requested service in response to a determination that a user disconnected from the requested service.

25. The method of claim 24, further comprising: receiving a user account logon access request at the computer network; and sending an account logon accounting start request to the accounting server.

26. The method in accordance with claim 25, further comprising:
authorizing and authenticating the user in response to receiving the user account logon access request.

27. The method in accordance with claim 25, further comprising;
establishing a connection between the user and the requested service if the requested service is contained within a service profile of the user.

28. The method in accordance with claim 27, further comprising:
sending a connection accounting start request to the accounting server; and
sending a connection accounting stop request to the accounting server in response to a determination that the user disconnected from the requested service.

29. The method in accordance with claim 28, further comprising:
re-sending the connection accounting start request at predetermined intervals upon determining that the initial connection accounting start request was not received by the accounting server.

30. The method in accordance with claim 28, further comprising:
re-sending the connection accounting stop request at predetermined intervals upon determining that the initial connection accounting stop request was not received by the accounting server.

31. The method in accordance with claim 25, further comprising:
sending an account logoff accounting stop request to the accounting service in response to a determination that the user terminated the user account logon access request.

32. The method in accordance with claim 31, further comprising:
re-sending the account logoff accounting stop request at predetermined intervals upon determining that the initial account logoff accounting stop request was not received by the accounting server.

33. The method in accordance with claim 25, wherein said receiving a user account logon access request includes:
receiving the user account logon access request directly from a dashboard application launched on the user's host computer.

34. The method in accordance with claim 25, wherein said receiving a user account logon access request includes:
receiving the user account logon access request from a remote web server.

35. The method in accordance with claim 25, further comprising:
generating an update accounting request at predetermined intervals after the user account logon account access request is received into the accounting server; and
forwarding the update accounting request to the accounting server.

36. The method in accordance with claim 25, further comprising:

re-sending the accounting logon accounting start request at predetermined intervals upon determining that the initial account logon accounting start request was not received by the accounting server.

37. The method in accordance with claim 25, further comprising:

re-sending the service accounting start request at predetermined intervals upon determining that the initial service accounting start request was not received by the accounting server.

38. The method in accordance with claim 25, further comprising:

re-sending the service accounting stop request at predetermined intervals upon determining that the initial service accounting stop request was not received by the accounting server.

39. A program storage device readable by a machine, tangibly embodying a program of instructions readable by the machine to perform a method for providing accounting to a computer network, said method comprising:

receiving a user service access request at the computer network to access a requested service;

sending a service accounting start request associated with the requested service to an accounting server if the computer network has not established a service connection with the requested service; and sending a service accounting stop request associated with the requested service to the accounting server if no other hosts have current connections to the requested service in response to a determination that a user disconnected from the requested service.

40. The program storage device in accordance with claim 39, wherein said method further comprises:

receiving a user account logon access request at the computer network; and sending an account logon accounting start request to an accounting server.

41. The program storage device in accordance with claim 40, wherein said method further comprises:

authorizing and authenticating the user in response to receiving the user account logon access request.

42. The program storage device in accordance with claim 40, wherein said receiving a user account logon request comprises:

receiving the user account logon access request directly from a dashboard application launched on the user's host computer.

43. The program storage device in accordance with claim 40, wherein said receiving a user account logon access request comprises:

receiving the user account logon access request from a remote web server.

44. The program storage device in accordance with claim 40, wherein said method further comprises:

sending an account logoff accounting stop request to the accounting service in response to a determination that the user terminated the user account logon access request.

45. The program storage device in accordance with claim 44, wherein said method further comprises:

re-sending the account logoff accounting stop request at predetermined intervals upon determining that the initial account logoff accounting stop request was not received by the accounting server.

46. The program storage device in accordance with claim 40, wherein said method further comprises:

re-sending the accounting logon accounting start request at predetermined intervals upon determining that the initial account logon accounting start request was not received by the accounting server.

47. The program storage device in accordance with claim 39, wherein said method further comprises:

granting user service privileges to the user if the requested service is contained within a service profile of the user.

48. The program storage device in accordance with claim 39, wherein said method further comprises:

establishing a connection between the user and the requested service if the requested service is contained within a service profile of the user.

49. The program storage device in accordance with claim 39, wherein said method further comprises:

sending a connection accounting start request to the accounting server; and sending a connection accounting stop request to the accounting server in response to a determination that the user disconnected from the requested service.

50. The program storage device in accordance with claim 49, wherein said method further comprises:

re-sending the connection accounting start request at predetermined intervals upon determining that the initial connection accounting start request was not received by the accounting server.

51. The program storage device in accordance with claim 49, wherein said method further comprises:

re-sending the connection accounting stop request at predetermined intervals upon determining that the initial connection accounting stop request was not received by the accounting server.

52. The program storage device in accordance with claim 39, wherein said method further comprises:

generating an update accounting request at predetermined intervals after the user account logon account access request is received into the accounting server; and forwarding the update accounting request to the accounting server.

53. The program storage device in accordance with claim 39, wherein said method further comprises:

re-sending the service accounting start request at predetermined intervals upon determining that the initial service accounting start request was not received by the accounting server.

54. The program storage device in accordance with claim 39, wherein said method further comprises:

re-sending the service accounting stop request at predetermined intervals upon determining that the initial service accounting stop request was not received by the accounting server.

* * * * *